(12) United States Patent
Zhao et al.

(10) Patent No.: US 10,924,526 B2
(45) Date of Patent: Feb. 16, 2021

(54) ADAPTING AN AUDIO BIT RATE BASED ON CHANGING NETWORK CONDITIONS

(71) Applicant: Verizon Patent and Licensing Inc., Basking Ridge, NJ (US)

(72) Inventors: Hui Zhao, Marlboro, NJ (US); Jun Yuan, Cranbury, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 155 days.

(21) Appl. No.: 16/100,782

(22) Filed: Aug. 10, 2018

(65) Prior Publication Data

US 2020/0053141 A1 Feb. 13, 2020

(51) Int. Cl.
*H04L 29/06* (2006.01)
*H04L 12/26* (2006.01)
*H04W 84/04* (2009.01)

(52) U.S. Cl.
CPC ........ *H04L 65/604* (2013.01); *H04L 43/0829* (2013.01); *H04L 65/1069* (2013.01); *H04L 65/608* (2013.01); *H04W 84/042* (2013.01)

(58) Field of Classification Search
CPC ............. H04L 43/0829; H04L 65/1069; H04L 65/604; H04L 65/608; H04W 84/042
See application file for complete search history.

(56) References Cited

U.S. PATENT DOCUMENTS

| 2007/0165636 A1* | 7/2007 | He | H04W 88/181 370/391 |
| 2011/0170410 A1* | 7/2011 | Zhao | H04L 47/10 370/232 |
| 2020/0045587 A1* | 2/2020 | Choi | H04L 65/608 |

* cited by examiner

*Primary Examiner* — Asad M Nawaz
*Assistant Examiner* — Zhaohui Yang

(57) ABSTRACT

A first device receives information indicating changed network conditions for a network supporting a call with a second device at a first audio bit rate, and provides, to the second device, a packet instructing use of a second audio bit rate. The first device starts a timer associated with receiving an indication that the second device is using the second audio bit rate, and receives, from the second device, a response packet at the first audio bit rate. The first device determines that the timer has expired, and provides, to the second device, additional packets instructing use of the second audio bit rate. The first device determines that a threshold quantity of additional packets have been provided to the second device, and re-negotiates the second audio bit rate with the second device. The first device continues the call with the second device at the second audio bit rate.

20 Claims, 10 Drawing Sheets

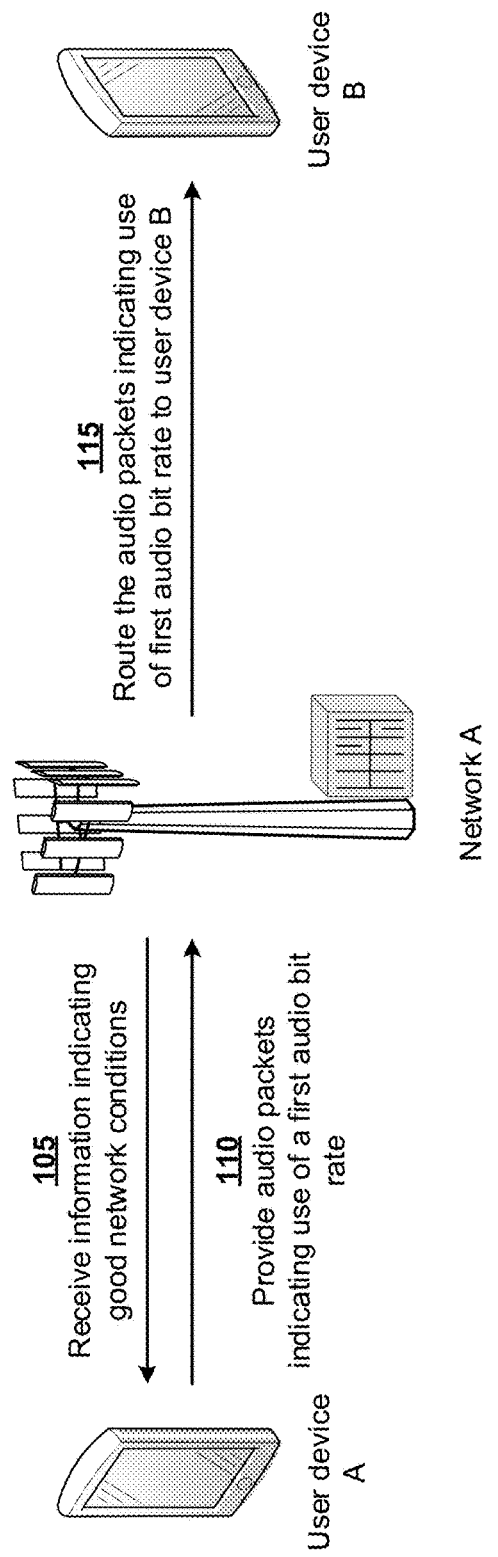

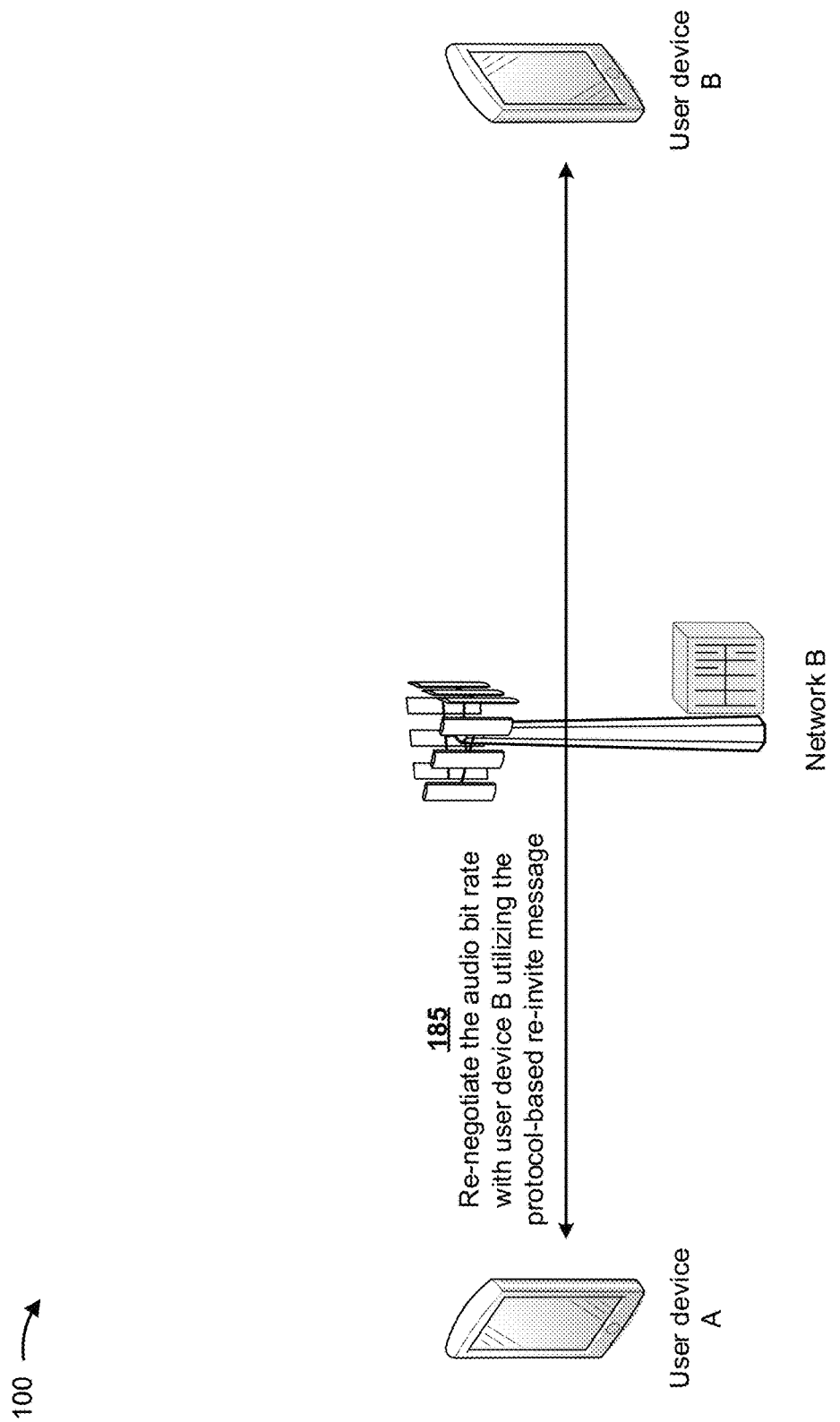

US 10,924,526 B2

ADAPTING AN AUDIO BIT RATE BASED ON CHANGING NETWORK CONDITIONS

BACKGROUND

In a wireless network, audio codecs (e.g., adaptive multi-Rate (AMR), adaptive multi-rate wideband (AMR-WB), enhanced voice services (EVS), and/or the like) can be used to provide voice and/or video services. Multiple audio bit rates can be used for each audio codec (e.g., five audio bit rates can be used for the EVS codec). Each different audio bit rate can require different physical channel resources in an air interface and different link budget requirements.

In a typical situation, a high audio (e.g., codec) bit rate can be used to provide better audio quality voice service and a low audio (e.g., codec) bit rate can be used to improve wireless network coverage (e.g., and decrease a call drop rate) or to increase wireless network capacity (e.g., increase a quantity of users that can be simultaneously supported). Audio bit rate adaptation that enables audio bit rate adjustment during a call can be desired if a negotiated audio codec contains multiple bit rates.

BRIEF DESCRIPTION OF THE DRAWINGS

FIGS. 1A-1G are diagrams of an example implementation described herein.

DETAILED DESCRIPTION OF PREFERRED EMBODIMENTS

Figure 1B:
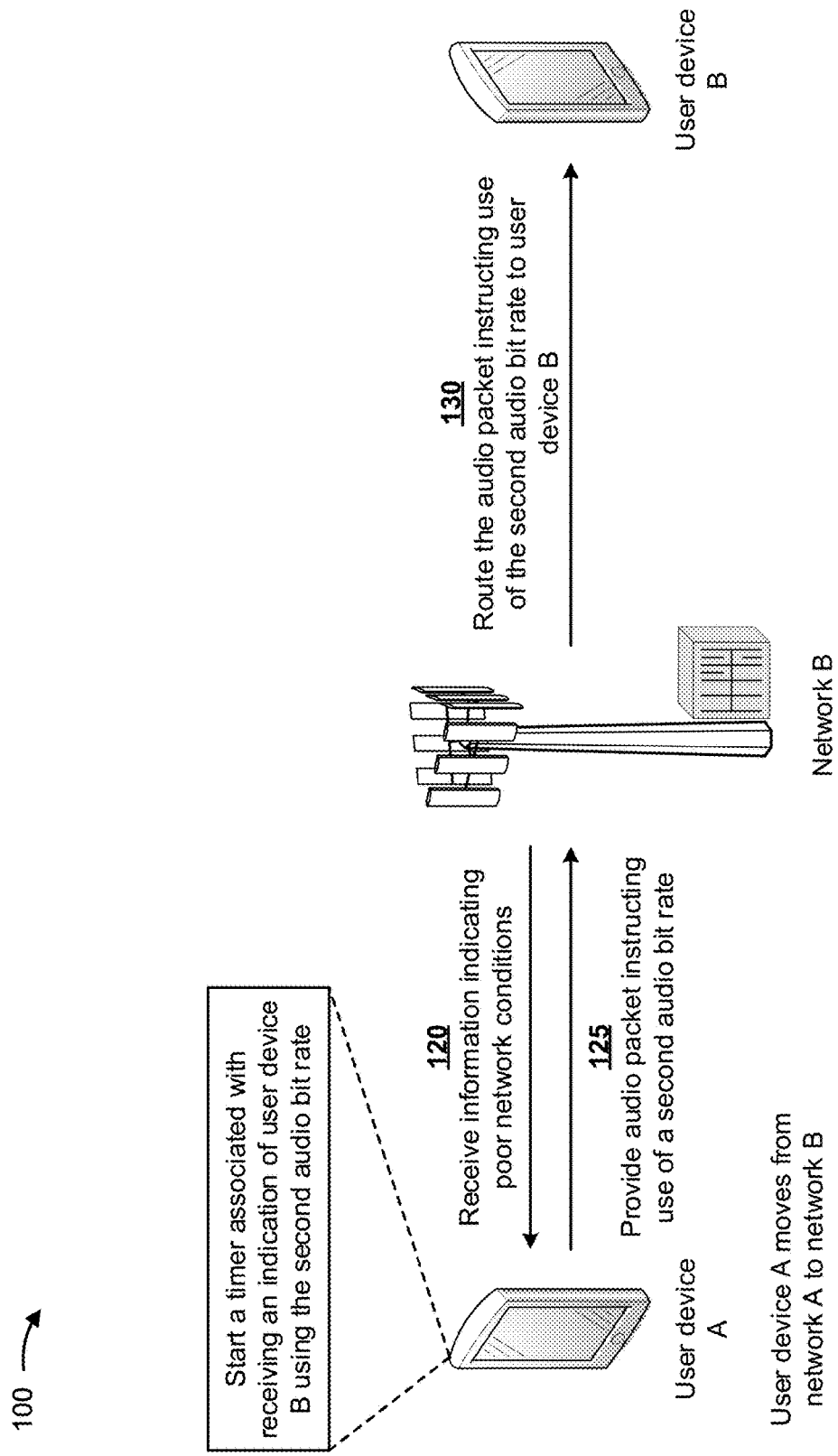

The following detailed description of example implementations refers to the accompanying drawings. The same reference numbers in different drawings can identify the same or similar elements.

One audio bit rate adaptation mechanism (e.g., that can be utilized by a first user device) is a real-time transport protocol (RTP) in-band codec mode request (CMR) mechanism that piggybacks audio bit rate change request information (e.g., a CMR) in an audio RTP packet, and transmits the audio RTP packet in radio link control (RLC) unacknowledged mode (UM). When a second user device (e.g., a receiving user device) receives the audio RTP packet with the CMR, the second user device changes to an audio bit rate that does not exceed the audio bit rate defined in the CMR.

When the first user device experiences changing wireless network conditions (e.g., moves to a weak coverage area of the wireless network), a lower audio bit rate can be used to prevent a call drop with the second user device. However, the RTP packet, which carries a CMR rate adaptation command, is transmitted in the RLC UM, so a transmitting user device (e.g., the first user device) will not receive packet delivery confirmation from the receiving user device (e.g., the second user device). To make things worse, the RTP packet can be carried by a user datagram protocol (UDP), which is not a reliable transport protocol. If the RTP packet is lost (e.g., due to the weak coverage area of the wireless network or an unreliable transport protocol), the audio bit rate adaptation will not occur at the second user device, which can increase a likelihood of a call drop.

Some implementations described herein provide a first user device that adapts an audio bit rate based on changing network conditions. For example, the first user device can receive information indicating changed network conditions for a network supporting a call with a second user device at a first audio bit rate, and can provide, to the second user device, an audio packet instructing use of a second audio bit rate that is different from the first audio bit rate. The first user device can start a timer associated with receiving an indication that the second user device is using the second audio bit rate, and can receive, from the second user device and based on the audio packet, a response audio packet at the first audio bit rate. The first user device can determine that the timer has expired after receiving the response audio packet at the first audio bit rate, and can provide, to the second user device, one or more additional audio packets instructing use of the second audio bit rate. The first user device can determine that a threshold quantity of additional audio packets have been provided to the second user device, and can re-negotiate the second audio bit rate with the second user device based on a protocol-based re-invite message provided to the second user device. The first user device can continue the call with the second user device, at the second audio bit rate and without dropping the call, based on the re-invite message.

FIGS. 1A-1G are diagrams of an example implementation 100 described herein. As shown in FIG. 1A, a first user device (e.g., user device A) can be associated with a first network (e.g., a wireless network, such as network A) and a second user device (e.g., user device B). In some implementations, the first user device can establish a call (e.g., a voice call, a video call, and/or the like) with the second user device, via the first network.

As further shown in FIG. 1A, and by reference number 105, the first user device can receive, from the first network, information indicating good network conditions. In some implementations, the information indicating good network conditions can include information indicating a quantity of packets lost by the first network. In such implementations, the first user device can compare the information indicating the quantity of packets lost by the first network with a packet loss threshold, and can determine that the quantity of packets lost by the first network does not satisfy the packet loss threshold. Based on determining that the quantity of packets lost by the first network does not satisfy the packet loss threshold, the first user device can determine that the first network is providing good network conditions (e.g., low congestion and/or high bandwidth) for the call with the second user device. In some implementations, the first user device can determine that the first network is providing good network conditions based on one or more other network indicators, such as latency of the first network, bandwidth of the first network, jitter associated with the first network, and/or the like.

As further shown in FIG. 1A, and by reference number 110, the first user device can provide, to the first network, audio packets indicating use of a first audio bit rate and destined for the second user device. In some implementations, the first audio bit rate can include a high audio (e.g., codec) bit rate that provides better audio quality voice service since the first network is providing good network conditions. In some implementations, the audio packets can include RTP packets with CMRs indicating use of the first audio bit rate (e.g., the high codec bit rate).

As further shown in FIG. 1A, and by reference number 115, the first network can route the audio packets indicating use of the first audio bit rate to the second user device. The second user device can receive the audio packets and can examine the audio packets. For example, the second user device can examine the CMRs indicating use of the first audio bit rate, and can determine that response audio packets (e.g., from the second user device) can be provided at the first audio bit rate (e.g., due to the good network conditions). In some implementations, the second user device can provide the response audio packets (e.g., responding to the audio packets) at the first audio bit rate to the first user device, via the first network.

As shown in FIG. 1B, assume that the first user device moves from the first network to a second network (e.g., network B) or that the first network experiences degraded network conditions. In such a scenario, the first user device can experience changed network conditions. For example, as further shown in FIG. 1B and by reference number 120, the first user device can receive, from the second network, information indicating poor network conditions. In some implementations, the information indicating poor network conditions can include information indicating a quantity of packets lost by the second network. In such implementations, the first user device can compare the information indicating the quantity of packets lost by the second network with the packet loss threshold, and can determine that the quantity of packets lost by the second network satisfies the packet loss threshold. Based on determining that the quantity of packets lost by the second network satisfies the packet loss threshold, the first user device can determine that the second network is providing poor network conditions (e.g., high congestion and/or low bandwidth) for the call with the second user device. In some implementations, the first user device can determine that the second network is providing poor network conditions based on one or more other network indicators, such as latency of the second network, bandwidth of the second network, jitter associated with the second network, and/or the like.

As further shown in FIG. 1B, and by reference number 125, the first user device can provide, to the second network, an audio packet instructing use of a second audio bit rate and destined for the second user device. In some implementations, the second audio bit rate can include a low audio (e.g., codec) bit rate that improves a coverage of the second network (e.g., decreases call drop rates) or increases a capacity of the second network (e.g., increases a quantity of user devices that can be simultaneously supported) since the second network is providing poor network conditions. In some implementations, the audio packet can include a RTP packet with a CMR instructing use of the second audio bit rate (e.g., the low codec bit rate).

As further shown in FIG. 1B, the first user device can start a timer associated with receiving an indication of the second user device using the second audio bit rate. In some implementations, the first user device can start the timer after sending the audio packet instructing use of the second audio bit rate. In some implementations, the first user device can start the timer simultaneously with sending the audio packet instructing use of the second audio bit rate. In some implementations, the first user device can start the timer before sending the audio packet instructing use of the second audio bit rate. In some implementations, the timer can provide a time period during which the second user device can receive the audio packet and generate a response audio packet at the second audio bit rate. In such implementations, the time period can provide an indication of whether the second user device received the audio packet instructing use of the second audio bit rate.

As further shown in FIG. 1B, and by reference number 130, the second network can route the audio packet instructing use of the second audio bit rate to the second user device. The second user device can receive the audio packet and can examine the audio packet. For example, the second user device can examine the CMR instructing use of the second audio bit rate, and can determine that a response audio packet (e.g., from the second user device) can be provided at the second audio bit rate (e.g., due to the poor network conditions).

Figure 1C:
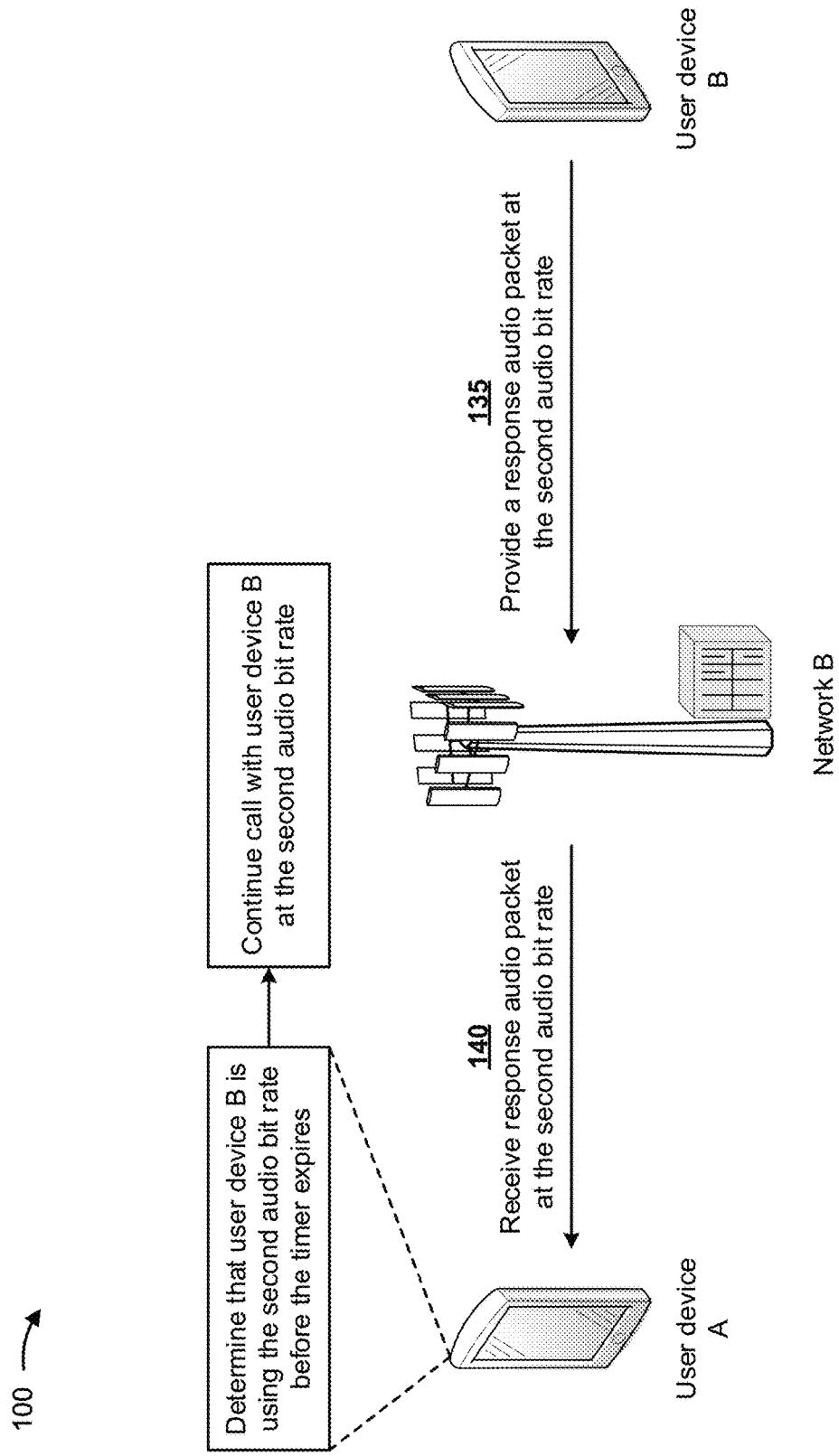

As shown in FIG. 1C, and by reference number 135, the second user device can provide the response audio packet (e.g., responding to the audio packet) at the second audio bit rate to the first user device, via the second network. As further shown in FIG. 1C, and by reference number 140, the first user device can receive the response audio packet at the second audio bit rate. In some implementations, based upon receiving the response audio packet at the second audio bit rate, the first user device can determine that the second user device is using the second audio bit rate before the timer expires. In such implementations, the first user device can continue the call with the second user device at the second audio bit rate, and the second audio bit rate can help prevent the call from being dropped by the second network.

Figure 1D:
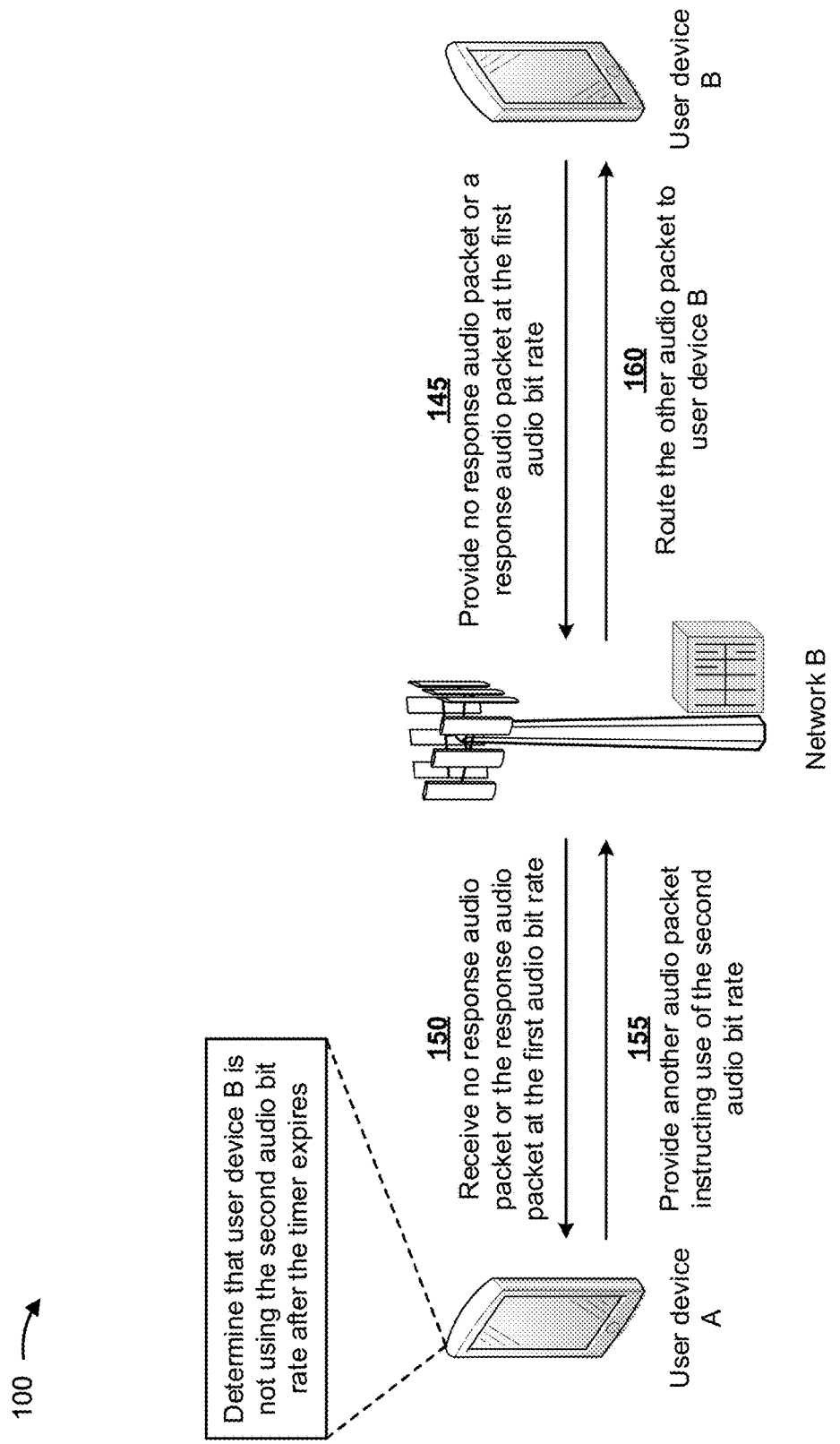

With reference to FIG. 1D, assume that the due to the poor network conditions, the second user device does not receive the audio packet instructing use of the second audio bit rate. In such a situation, and as shown by reference number 145 in FIG. 1D, the second user device cannot generate a response audio packet since the audio packet was not received by the second user device, cannot provide a response audio packet to the first user device, can provide a response audio packet at the first audio bit rate to the first user device, and/or the like. In some implementations, the second user device can provide the response audio packet at the first audio bit rate to the first user device, not because the audio packet was received by the second user device, but rather because a user of the second user device utilizes the second user device to generate the response audio packet. For example, the user of the second user device can speak into the second user device to generate the response audio packet, and the second user device can provide the response audio packet at the first audio bit rate to the first user device since the audio packet was not received by the second user device.

As further shown in FIG. 1D, and by reference number 150, the first user device cannot receive a response audio packet from the second user device or can receive the response audio packet at the first audio bit rate from the second user device. In some implementations, the first user device can determine, based on not receiving a response audio packet or based on receiving the response audio packet at the first audio bit rate, that the second user device is using an audio bit rate greater than the second audio bit rate after the timer expires. Based on the determining that the second user device is using an audio bit rate greater than the second audio bit rate after the timer expires, the first user device can determine that the second user device did not receive the audio packet instructing use of the second audio bit rate.

As further shown in FIG. 1D, and by reference number 155, the first user device can provide, to the second network, another audio packet instructing use of the second audio bit rate and destined for the second user device. As further shown in FIG. 1D, and by reference number 160, the second network can route the other audio packet instructing use of the second audio bit rate to the second user device.

Figure 1E:
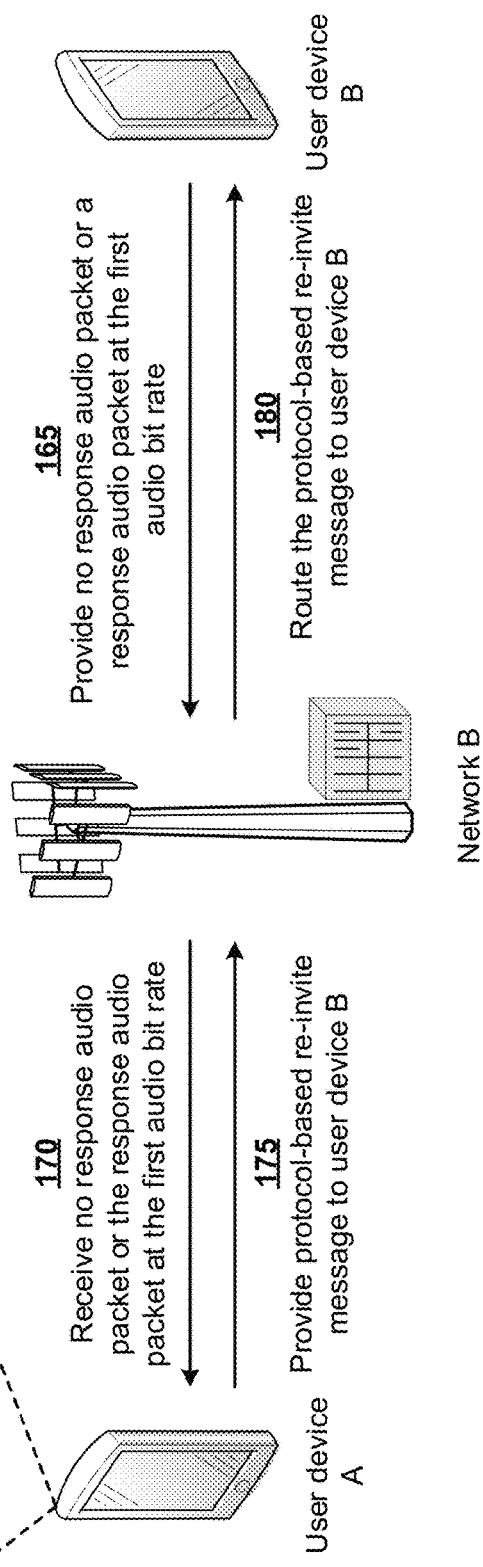

With reference to FIG. 1E, assume that the due to the poor network conditions, the second user device does not receive the other audio packet instructing use of the second audio bit rate. In such a situation, and as shown by reference number 165 in FIG. 1E, the second user device cannot generate a response audio packet since the other audio packet was not received by the second user device, cannot provide a response audio packet to the first user device, can provide a response audio packet at the first audio bit rate to the first user device, and/or the like. In some implementations, the second user device can provide the response audio packet at the first audio bit rate to the first user device, not because the other audio packet was received by the second user device, but rather because the user of the second user device utilizes the second user device to generate the response audio packet, as described above.

As further shown in FIG. 1E, and by reference number 170, the first user device cannot receive a response audio packet from the second user device or can receive the response audio packet at the first audio bit rate from the second user device. In some implementations, the first user device can determine, based on not receiving a response audio packet or based on receiving the response audio packet at the first audio bit rate, that the second user device is using an audio bit rate greater than the second audio bit rate. Based on the determining that the second user device is using an audio bit rate greater than the second audio bit rate, the first user device can determine that the second user device did not receive the other audio packet instructing use of the second audio bit rate.

In some implementations, the first user device can continue to transmit audio packets instructing use of the second audio bit rate. In some implementations, the first user device can define a threshold quantity of transmitted audio packets so that the first user device does not continuously transmit the audio packets. In some implementations, a user of the first user device can define the threshold quantity of transmitted audio packets. In some implementations, the threshold quantity can be preprogrammed into the first user device. In some implementations, the threshold quantity can be signaled from a network (e.g., the first network, the second network, and/or the like).

Once the first user device transmits audio packets that satisfy the threshold quantity of transmitted audio packets, the first user device can cease transmitting the audio packets. Rather, as shown by reference number 175 in FIG. 1E, the first user device can provide a protocol-based re-invite message to the second network and destined for the second user device. In some implementations, the protocol-based re-invite message can include a session initiation protocol (SIP) re-invite message that requests re-negotiation of the second audio bit rate. In some implementations, the SIP re-invite message can provide a more reliable way to communicate with the second user device, but can utilize additional SIP signaling resources. The SIP re-invite message can prevent the call from being dropped due to the poor network conditions. As further shown in FIG. 1E, and by reference number 180, the second network can route the protocol-based re-invite message to the second user device.

As shown in FIG. 1F, and by reference number 185, the first user device can re-negotiate the second audio bit rate with the second user device based on the protocol-based re-invite message. For example, the first user device can utilize the SIP signaling resources to instruct the second user device to switch to the second audio bit rate for the call (e.g., so that the call is not dropped due to the poor network conditions). Based on the instruction, the second user device can switch to the second audio bit rate for the call.

Figure 1G:
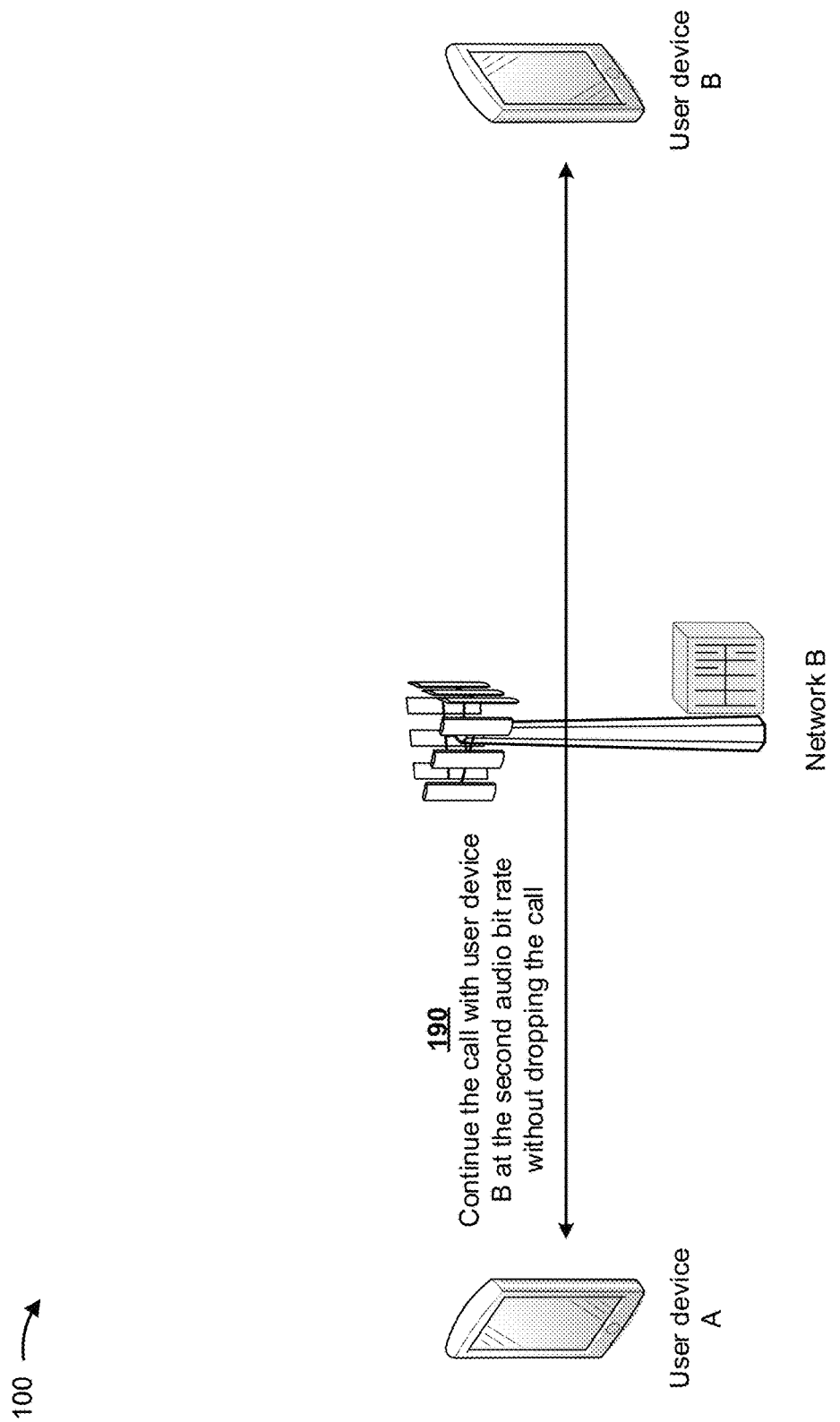

As shown in FIG. 1G, and by reference number 190, the first user device can continue the call with the second user device, at the second audio bit rate and without dropping the call, based on the protocol-based re-invite message. In this way, the first user device can ensure that a call is maintained even in poor network conditions.

In this way, several different stages of the process for adapting an audio bit rate based on changing network conditions are automated, which can remove human subjectivity and waste from the process, and which can improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that automatically adapts an audio bit rate based on changing network conditions. Finally, automating the process for adapting an audio bit rate based on changing network conditions conserves computing resources (e.g., processing resources, memory resources, and/or the like) associated with the first user device and that would otherwise be wasted in attempting to adapt an audio bit rate based on changing network conditions.

As indicated above, FIGS. 1A-1G are provided merely as examples. Other examples are possible and can differ from what was described with regard to FIGS. 1A-1G.

Figure 2:
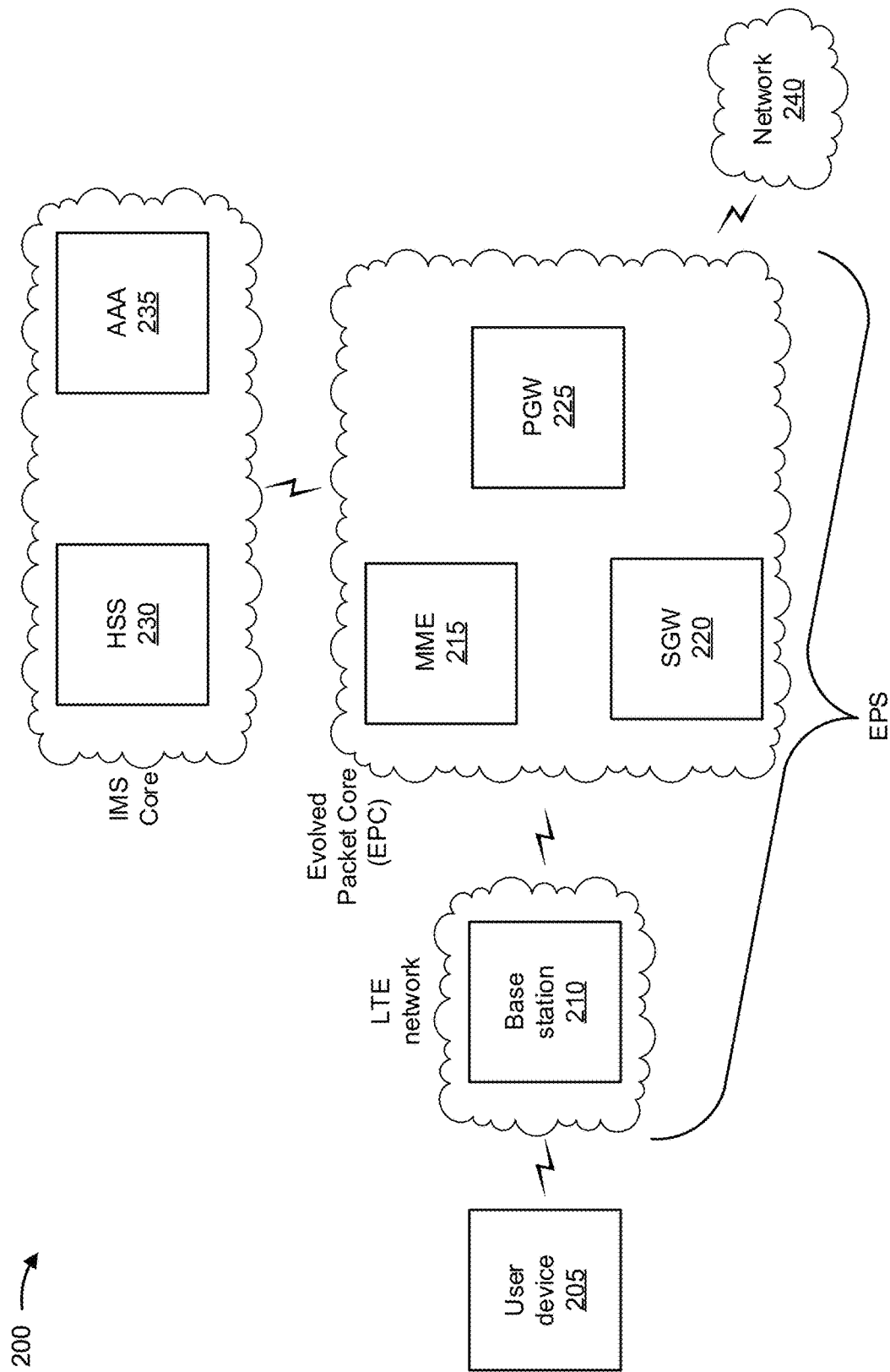
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205, a base station 210, a mobility management entity device (MME) 215, a serving gateway (SGW) 220, a packet data network gateway (PGW) 225, a home subscriber server (HSS) 230, an authentication, authorization, and accounting server (AAA) 235; and a network 240. Devices of environment 200 can interconnect via wired connections, wireless connections, or a combination of wired and wireless connections.

Some implementations are described herein as being performed within a long-term evolution (LTE) network for explanatory purposes. Some implementations can be performed within a network that is not an LTE network, such as a third generation (3G) network, a fifth generation (5G) network, and/or the like.

Environment 200 can include an evolved packet system (EPS) that includes an LTE network and/or an evolved packet core (EPC) that operate based on a third-generation partnership project (3GPP) wireless communication standard. The LTE network can include a radio access network (RAN) that includes one or more base stations 210 that take the form of evolved Node Bs (eNBs) via which user device 205 communicates with the EPC. The EPC can include MME 215, SGW 220, and/or PGW 225 to enable user device 205 to communicate with network 240 and/or an Internet protocol (IP) multimedia subsystem (IMS) core. The IMS core can include HSS 230 and/or AAA 235, and can manage device registration and authentication, session initiation, and/or the like, associated with user devices 205. HSS 230 and/or AAA 235 can reside in the EPC and/or the IMS core.

User device 205 includes one or more devices capable of communicating with other user devices 205, base station 210, and/or a network (e.g., network 240). For example, user device 205 can include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. User device 205 can send traffic to and/or receive traffic from another user device 205 and/or network 240 (e.g., via base station 210, SGW 220, and/or PGW 225).

Base station 210 includes one or more devices capable of transferring traffic, such as audio, video, text, and/or other traffic, destined for and/or received from user device 205. In some implementations, base station 210 can include an eNB associated with the LTE network that receives traffic from and/or sends traffic to network 240 via SGW 220 and/or PGW 225. Additionally, or alternatively, one or more base stations 210 can be associated with a RAN that is not associated with the LTE network. Base station 210 can send traffic to and/or receive traffic from user device 205 via an air interface. In some implementations, base station 210 can include a small cell base station, such as a base station of a microcell, a picocell, a femtocell, and/or the like.

MME 215 includes one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to provide traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 240 (e.g., via PGW 225) and/or other network devices associated with the EPC and/or the IMS core. SGW 220 can receive traffic from network 240 and/or other network devices, and can send the received traffic to user device 205 via base station 210. Additionally, or alternatively, SGW 220 can perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a MC, a hub, a bridge, a server device, an OADM, or any other type of device that processes and/or transfers traffic. In some implementations, PGW 225 can aggregate traffic received from one or more SGWs 220, and can send the aggregated traffic to network 240. Additionally, or alternatively, PGW 225 can receive traffic from network 240, and can send the traffic to user device 205 via SGW 220 and base station 210.

PGW 225 can record data usage information (e.g., byte usage), and can provide the data usage information to AAA 235.

HSS 230 includes one or more devices, such as one or more server devices, capable of managing (e.g., receiving, generating, storing, processing, providing, and/or the like) information associated with user device 205. For example, HSS 230 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 includes one or more devices, such as one or more server devices, that perform authentication, authorization, and/or accounting operations for communication sessions associated with user device 205. For example, AAA 235 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

Network 240 includes one or more wired and/or wireless networks. For example, network 240 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
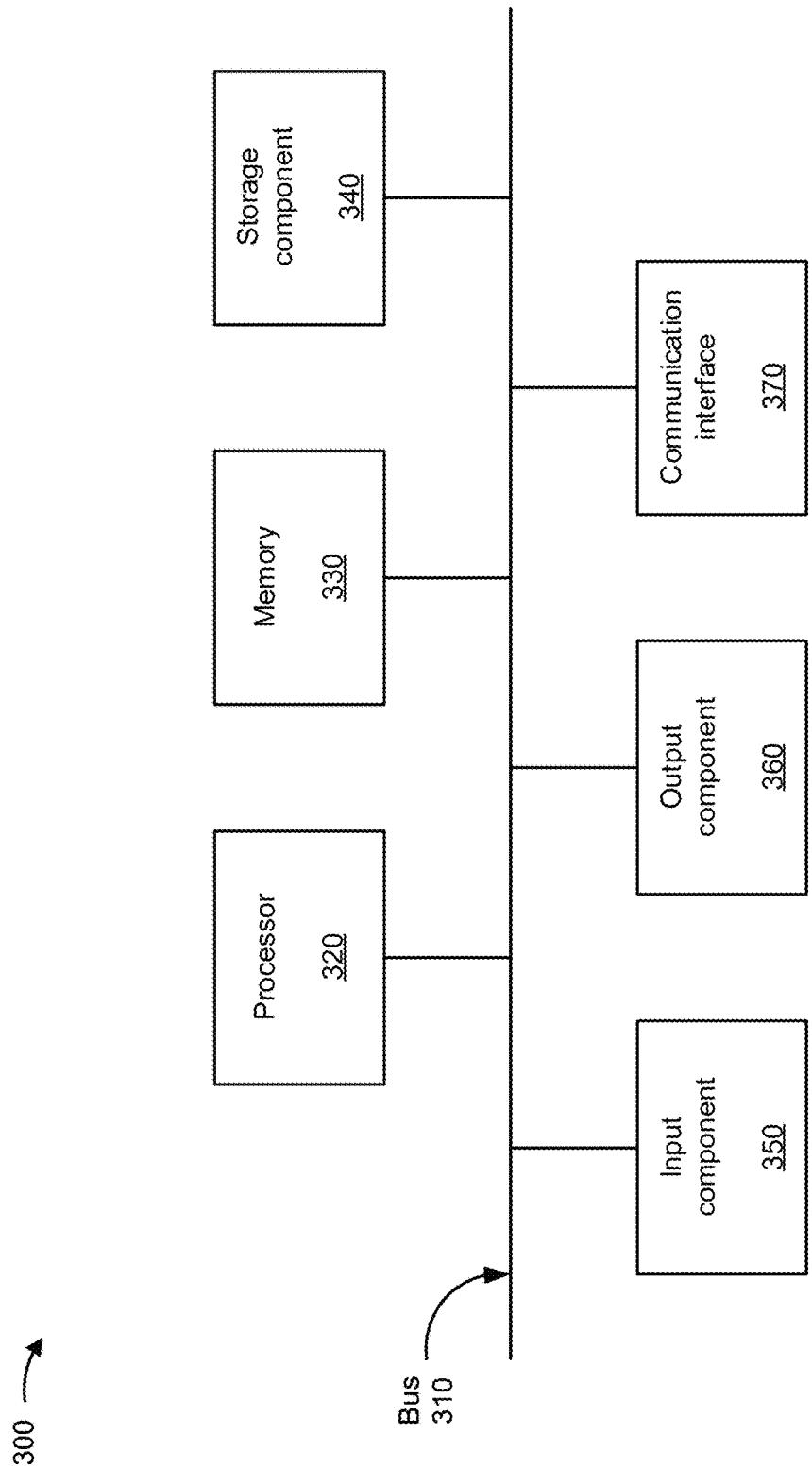
FIG. 3 is a diagram of example components of one or more devices of FIG. 2.

FIG. 3 is a diagram of example components of a device 300. Device 300 can correspond to user device 205, base station 210, MME 215, SGW 220, PGW 225, HSS 230, and/or AAA 235. In some implementations, user device 205, base station 210, MME 215, SGW 220, PGW 225, HSS 230, and/or AAA 235 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
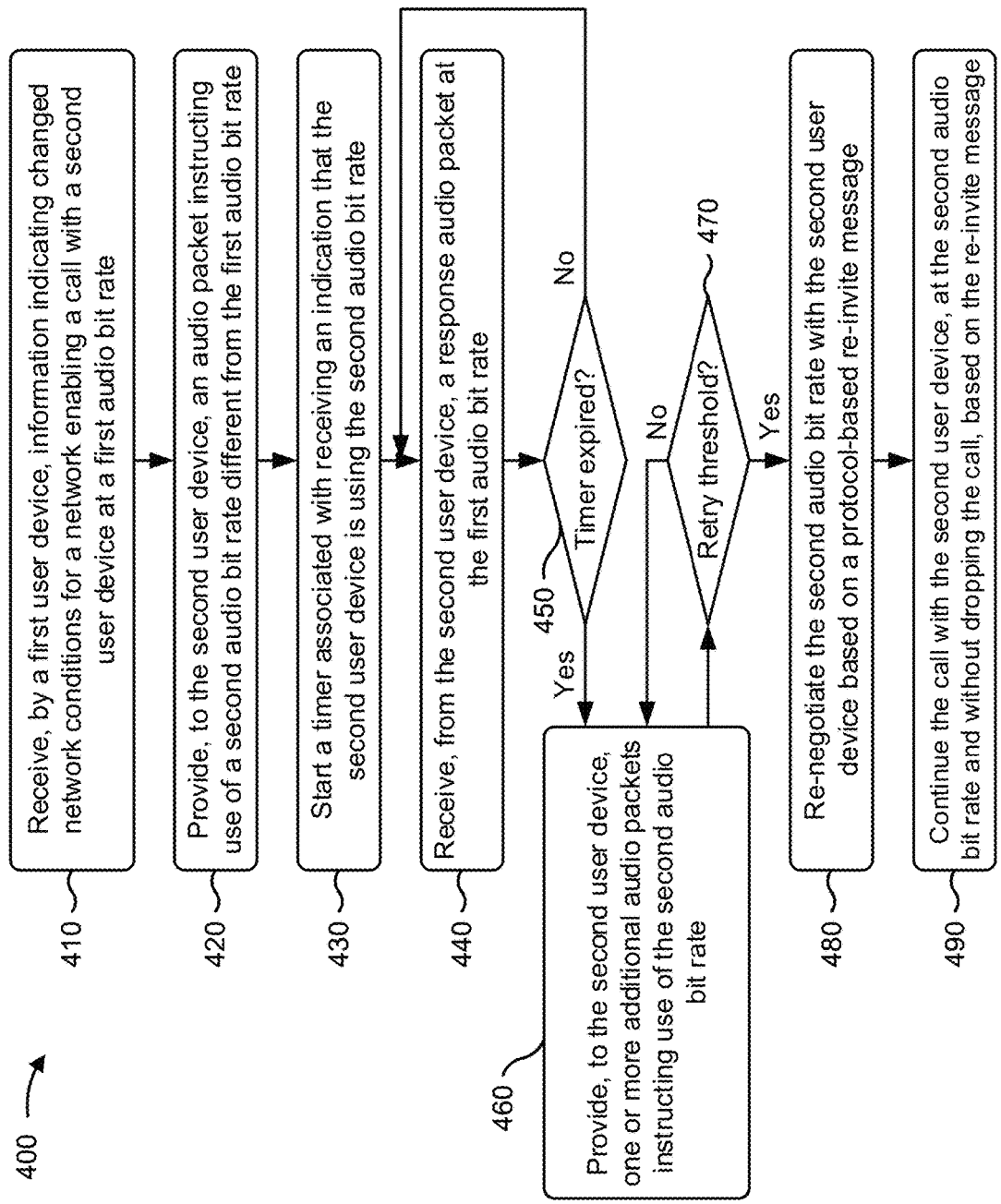
FIG. 4 is a flow chart of an example process for adapting an audio bit rate based on changing network conditions.

FIG. 4 is a flow chart of an example process 400 for adapting an audio bit rate based on changing network conditions. In some implementations, one or more process blocks of FIG. 4 can be performed by a first user device (e.g., user device 205). In some implementations, one or more process blocks of FIG. 4 can be performed by another device or a group of devices separate from or including the first user device, such as a second user device (e.g., user device 205) and/or a base station (e.g., base station 210).

As shown in FIG. 4, process 400 can include receiving information indicating changed network conditions for a network supporting a call with a second user device at a first audio bit rate (block 410). For example, a first user device (e.g., using processor 320, communication interface 370, and/or the like) can receive information indicating changed network conditions for a network supporting a call with a second user device at a first audio bit rate, as described above in connection with FIGS. 1A-2.

As further shown in FIG. 4, process 400 can include providing, to the second user device, an audio packet instructing use of a second audio bit rate that is different from the first audio bit rate (block 420). For example, the first user device (e.g., using processor 320, memory 330, communication interface 370, and/or the like) can provide, to the second user device, an audio packet instructing use of a second audio bit rate that is different from the first audio bit rate, as described above in connection with FIGS. 1A-2.

As further shown in FIG. 4, process 400 can include starting a timer associated with receiving an indication that the second user device is using the second audio bit rate (block 430). For example, the first user device (e.g., using processor 320, memory 330, and/or the like) can start a timer associated with receiving an indication that the second user device is using the second audio bit rate, as described above in connection with FIGS. 1A-2.

As further shown in FIG. 4, process 400 can include receiving, from the second user device and based on the audio packet, a response audio packet at the first audio bit rate (block 440). For example, the first user device (e.g., using processor 320, communication interface 370, and/or the like) can receive, from the second user device and based on the audio packet, a response audio packet at the first audio bit rate, as described above in connection with FIGS. 1A-2.

As further shown in FIG. 4, process 400 can include determining that the timer has expired after receiving the response audio packet at the first audio bit rate (block 450). For example, the first user device (e.g., using processor 320, storage component 340, and/or the like) can determine that the timer has expired after receiving the response audio packet at the first audio bit rate, as described above in connection with FIGS. 1A-2. In some implementations, if the first user device determines that the timer has not expired, the first user device can receive, from the second user device and based on the audio packet, another response audio packet at the first audio bit rate.

As further shown in FIG. 4, process 400 can include providing, to the second user device, one or more additional audio packets instructing use of the second audio bit rate (block 460). For example, the first user device (e.g., using processor 320, storage component 340, communication interface 370, and/or the like) can provide, to the second user device, one or more additional audio packets instructing use of the second audio bit rate, as described above in connection with FIGS. 1A-2.

As further shown in FIG. 4, process 400 can include determining that a threshold quantity of additional audio packets have been provided to the second user device (block 470). For example, the first user device (e.g., using processor 320, memory 330, and/or the like) can determine that a threshold quantity of additional audio packets have been provided to the second user device, as described above in connection with FIGS. 1A-2. In some implementations, if the first user device determines that the threshold quantity of additional audio packets have not been provided to the second user device, the first user device can provide further audio packets to the second user device.

As further shown in FIG. 4, process 400 can include re-negotiating the second audio bit rate with the second user device based on a protocol-based re-invite message provided to the second user device (block 480). For example, the first user device (e.g., using processor 320, storage component 340, communication interface 370, and/or the like) can re-negotiate the second audio bit rate with the second user device based on a protocol-based re-invite message provided to the second user device, as described above in connection with FIGS. 1A-2.

As further shown in FIG. 4, process 400 can include continuing the call with the second user device, at the second audio bit rate and without dropping the call, based on the re-invite message (block 490). For example, the first user device (e.g., using processor 320, storage component 340, communication interface 370, and/or the like) can continue the call with the second user device, at the second audio bit rate and without dropping the call, based on the re-invite message, as described above in connection with FIGS. 1A-2.

Process 400 can include additional implementations, such as any single implementation or any combination of implementations described below and/or described with regard to any other process described herein.

In some implementations, the first audio bit rate can include a high codec bit rate, and the second audio bit rate can include a low codec bit rate. In some implementations, the first user device, when receiving the information indicating the changed network conditions, can receive, from the network, information indicating a packet loss associated with the network, and can determine the information indicating the changed network conditions when the information indicating the packet loss satisfies a packet loss threshold.

In some implementations, the audio packet instructing use of the second audio bit rate can include a real-time transport protocol (RTP) audio packet with a codec mode request (CMR), and the CMR can include a command instructing the second user device to switch from the first audio bit rate to the second audio bit rate.

In some implementations, the first user device can determine the threshold quantity of additional audio packets, can compare a quantity of the one or more additional audio packets, provided to the second user device, and the threshold quantity of additional audio packets, and can determine that the threshold quantity of additional audio packets have been provided to the second user device based on comparing the quantity of the one or more additional audio packets, provided to the second user device, and the threshold quantity of additional audio packets.

In some implementations, the protocol-based re-invite message can include a session initiation protocol (SIP) re-invite message. In some implementations, the first user device, when re-negotiating the second audio bit rate with the second user device, can utilize additional resources of the network to re-negotiate the second audio bit rate with the second user device, and the additional resources of the network can prevent the call from dropping.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations described herein provide a first user device that adapts an audio bit rate based on changing network conditions. For example, the first user device can receive information indicating changed network conditions for a network supporting a call with a second user device at a first audio bit rate, and can provide, to the second user device, an audio packet instructing use of a second audio bit rate that is different from the first audio bit rate. The first user device can start a timer associated with receiving an indication that the second user device is using the second audio bit rate, and can receive, from the second user device and based on the audio packet, a response audio packet at the first audio bit rate. The first user device can determine that the timer has expired after receiving the response audio packet at the first audio bit rate, and can provide, to the second user device, one or more additional audio packets instructing use of the second audio bit rate. The first user device can determine that a threshold quantity of additional audio packets have been provided to the second user device, and can re-negotiate the second audio bit rate with the second user device based on a protocol-based re-invite message provided to the second user device. The first user device can continue the call with the second user device, at the second audio bit rate and without dropping the call, based on the re-invite message.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first user device, comprising:
one or more memories; and
one or more processors, communicatively coupled to the one or more memories, to:
 receive information indicating changed network conditions for a network supporting a call with a second user device at a first audio bit rate;
 provide, to the second user device, an audio packet instructing use of a second audio bit rate that is different from the first audio bit rate;
 start a timer associated with receiving an indication that the second user device is using the second audio bit rate;
 receive, from the second user device and based on the audio packet instructing use of the second audio bit rate, a response audio packet at the first audio bit rate;
 determine that the timer has expired after receiving the response audio packet at the first audio bit rate;
 determine, based on determining that the timer has expired and receiving the response audio packet at the first audio bit rate, that the second user device did not receive the audio packet instructing use of the second audio bit rate;
 determine, based on determining that the second user device did not receive the audio packet instructing use of the second audio bit rate and based on a threshold quantity of additional audio packets being provided to the second user device, to cease transmitting audio packets instructing use of the second audio bit rate;
 provide, to the second user device, one or more additional audio packets instructing use of the second audio bit rate;
 determine that the threshold quantity of additional audio packets have been provided to the second user device;
 re-negotiate, based on the threshold quantity of additional audio packets being provided to the second user device, the second audio bit rate with the second user device based on a protocol-based re-invite message provided to the second user device; and
 continue the call with the second user device, at the second audio bit rate and without dropping the call, based on the re-invite message.

2. The first user device of claim 1, wherein:
the first audio bit rate is a high codec bit rate, and
the second audio bit rate is a low codec bit rate.

3. The first user device of claim 1, wherein the one or more processors, when receiving the information indicating the changed network conditions, are to:
 receive, from the network, information indicating a packet loss associated with the network; and
 the one or more processors are further to:
  determine the information indicating the changed network conditions when the information indicating the packet loss satisfies a packet loss threshold.

4. The first user device of claim 1, wherein the audio packet instructing use of the second audio bit rate includes a real-time transport protocol (RTP) audio packet with a codec mode request (CMR),
the CMR including a command instructing the second user device to switch from the first audio bit rate to the second audio bit rate.

5. The first user device of claim 1, wherein the one or more processors are further to:
 determine the threshold quantity of additional audio packets; and
 compare a quantity of the one or more additional audio packets, provided to the second user device, and the threshold quantity of additional audio packets, and
 the one or more processors, when determining that the threshold quantity of additional audio packets have been provided to the second user device, are to:
  determine that the threshold quantity of additional audio packets have been provided to the second user device based on comparing the quantity of the one or more additional audio packets, provided to the second user device, and the threshold quantity of additional audio packets.

6. The first user device of claim 1, wherein the protocol-based re-invite message includes a session initiation protocol (SIP) re-invite message.

7. The first user device of claim 1, wherein the one or more processors, when re-negotiating the second audio bit rate with the second user device, are to:
 utilize additional resources of the network to re-negotiate the second audio bit rate with the second user device, the additional resources of the network preventing the call from dropping.

8. A non-transitory computer-readable medium storing instructions, the instructions comprising:
 one or more instructions that, when executed by one or more processors of a first user device, cause the one or more processors to:
  receive information indicating changed network conditions for a network supporting a call with a second user device at a first audio bit rate;
  provide, to the second user device, an audio packet instructing use of a second audio bit rate that is different from the first audio bit rate;

start a timer associated with receiving an indication that the second user device is using the second audio bit rate;

receive, from the second user device and based on the audio packet instructing use of the second audio bit rate, a response audio packet at the first audio bit rate;

determine that the timer has expired after receiving the response audio packet at the first audio bit rate;

determine, based on determining that the timer has expired and receiving the response audio packet at the first audio bit rate, that the second user device did not receive the audio packet instructing use of the second audio bit rate;

determine, based on determining that the second user device did not receive the audio packet instructing use of the second audio bit rate and based on a threshold quantity of additional audio packets being provided to the second user device, to cease transmitting audio packets instructing use of the second audio bit rate;

provide, to the second user device, one or more additional audio packets instructing use of the second audio bit rate;

determine that the threshold quantity of additional audio packets have been provided to the second user device;

re-negotiate, based on the threshold quantity of additional audio packets being provided to the second user device, the second audio bit rate with the second user device based on a protocol-based re-invite message provided to the second user device; and continue the call with the second user device, at the second audio bit rate and without dropping the call, based on the re-invite message.

9. The non-transitory computer-readable medium of claim 8, wherein:
the first audio bit rate is a high codec bit rate, and
the second audio bit rate is a low codec bit rate.

10. The non-transitory computer-readable medium of claim 8, wherein the one or more instructions, that cause the one or more processors to receive the information indicating the changed network conditions, comprise:
one or more instructions that, when executed by the one or more processors, cause the one or more processors to:
receive, from the network, information indicating a packet loss associated with the network; and
determine the information indicating the changed network conditions when the information indicating the packet loss satisfies a packet loss threshold.

11. The non-transitory computer-readable medium of claim 8, wherein the audio packet instructing use of the second audio bit rate includes a real-time transport protocol (RTP) audio packet with a codec mode request (CMR),
the CMR including a command instructing the second user device to switch from the first audio bit rate to the second audio bit rate.

12. The non-transitory computer-readable medium of claim 8, wherein the instructions further comprise:
one or more instructions that, when executed by the one or more processors, cause the one or more processors to:
determine the threshold quantity of additional audio packets;
compare a quantity of the one or more additional audio packets, provided to the second user device, and the threshold quantity of additional audio packets; and
determine that the threshold quantity of additional audio packets have been provided to the second user device based on comparing the quantity of the one or more additional audio packets, provided to the second user device, and the threshold quantity of additional audio packets.

13. The non-transitory computer-readable medium of claim 8, wherein the protocol-based re-invite message includes a session initiation protocol (SIP) re-invite message.

14. The non-transitory computer-readable medium of claim 8, wherein the one or more instructions, that cause the one or more processors to re-negotiate the second audio bit rate with the second user device, comprise:
one or more instructions that, when executed by the one or more processors, cause the one or more processors to:
utilize additional resources of the network to re-negotiate the second audio bit rate with the second user device,
the additional resources of the network preventing the call from dropping.

15. A method, comprising:
receiving, by a first user device, information indicating changed network conditions for a network supporting a call with a second user device at a first audio bit rate;
providing, by the first user device and to the second user device, an audio packet instructing use of a second audio bit rate that is different from the first audio bit rate;
starting, by the first user device, a timer associated with receiving an indication of the second user device using the second audio bit rate;
receiving, by the first user device, from the second user device, and based on the audio packet instructing use of the second audio bit rate, a response audio packet at the first audio bit rate;
determining, by the first user device, that the timer has expired after receiving the response audio packet at the first audio bit rate;
determining, by the first user device and based on determining that the timer has expired and receiving the response audio packet at the first audio bit rate, that the second user device did not receive the audio packet instructing use of the second audio bit rate;
determining, by the first user device, based on determining that the second user device did not receive the audio packet instructing use of the second audio bit rate, and based on a threshold quantity of additional audio packets being provided to the second user device, to cease transmitting audio packets instructing use of the second audio bit rate;
providing, by the first user device and to the second user device, one or more additional audio packets instructing use of the second audio bit rate;
determining, by the first user device, that the threshold quantity of additional audio packets have been provided to the second user device;
re-negotiating, by the first user device and based on the threshold quantity of additional audio packets being provided to the second user device, the second audio bit rate with the second user device based on a protocol-based re-invite message provided to the second user device; and continuing, by the first user device, the call with the second user device, at the second audio bit rate and without dropping the call, based on the re-invite message.

16. The method of claim 15, wherein:
the first audio bit rate is a high codec bit rate, and
the second audio bit rate is a low codec bit rate.

17. The method of claim 15, wherein receiving the information indicating the changed network conditions comprises:
receiving, from the network, information indicating a packet loss associated with the network; and
the method further comprises:
determining the information indicating the changed network conditions when the information indicating the packet loss satisfies a packet loss threshold.

18. The method of claim 15, wherein the audio packet instructing use of the second audio bit rate includes a real-time transport protocol (RTP) audio packet with a codec mode request (CMR), the CMR including a command instructing the second user device to switch from the first audio bit rate to the second audio bit rate.

19. The method of claim 15, further comprising:
determining the threshold quantity of additional audio packets;
comparing a quantity of the one or more additional audio packets, provided to the second user device, and the threshold quantity of additional audio packets; and
determining that the threshold quantity of additional audio packets have been provided to the second user device based on comparing the quantity of the one or more additional audio packets, provided to the second user device, and the threshold quantity of additional audio packets.

20. The method of claim 15, wherein the protocol-based re-invite message includes a session initiation protocol (SIP) re-invite message.

* * * * *